March 17, 1970   R. A. HEINZEN ET AL   3,501,657
SYNCHRONOUS A.C. MOTOR WITH A PERMANENT MAGNET ROTOR AND
DIRECTIONAL CONTROL THEREFOR
Filed Jan. 8, 1969
FIG. 1
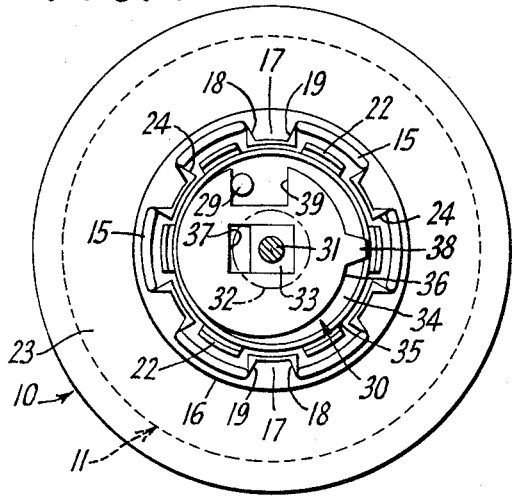
FIG. 3
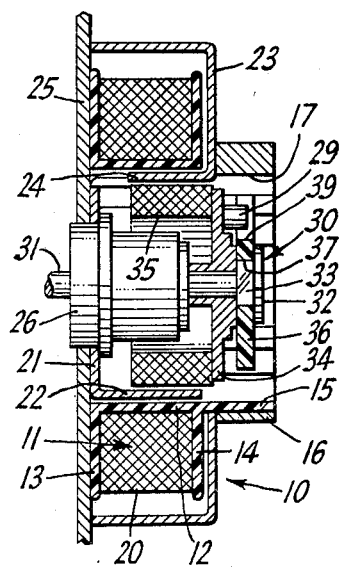
FIG. 2
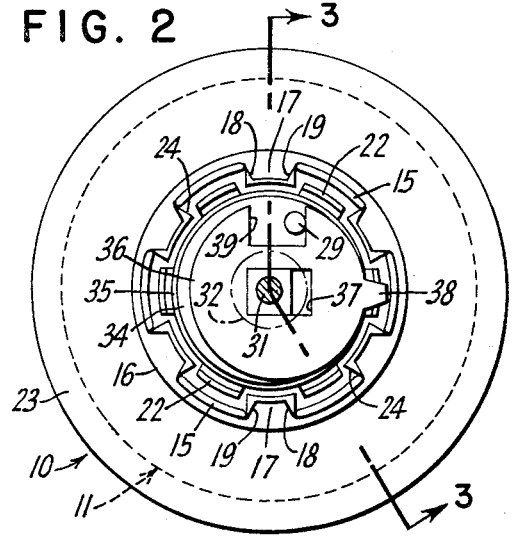
FIG. 4
FIG. 5
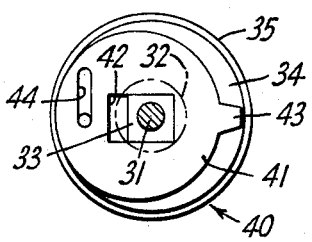
FIG. 6
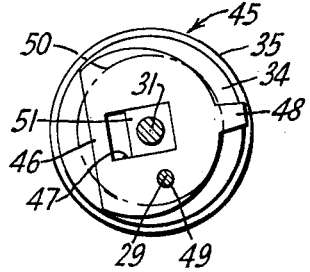
FIG. 7
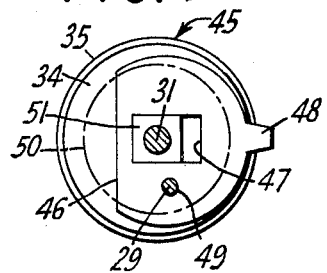
INVENTORS
ROBERT A. HEINZEN
EDWIN R. MORLEY
BY Charles J. Wortz
AGENT

# United States Patent Office 3,501,657
Patented Mar. 17, 1970

3,501,657
SYNCHRONOUS A.C. MOTOR WITH A PERMANENT MAGNET ROTOR AND DIRECTIONAL CONTROL THEREFOR
Robert A. Heinzen, Manitowoc, and Edwin R. Morley, Two Rivers, Wis., assignors to American Machine & Foundry Company, a corporation of New Jersey
Filed Jan. 8, 1969, Ser. No. 789,742
Int. Cl. H02k 7/118
U.S. Cl. 310—41                                    7 Claims

ABSTRACT OF THE DISCLOSURE

A synchronous A.C. motor including an A.C. coil with a tubular crown at one end with a formed inner surface providing an annular series of spaced inwardly extending abutments, a rotatable shaft, a permanent magnet rotor freely rotatable on the shaft within the coil, lost motion means coupling the rotor member to rotatably drive the shaft after limited rotation relative thereto and having a control member encircled by the crown portion and positively moved in a plane transverse to the shaft to a retracted position and to an extended position engaging one of the abutments in response to relative rotation of the rotor member and the direction thereof and positively held thereat thereby limiting the rotation to one desired direction.

---

This invention relates generally to synchronous A.C. motors and more particularly to such motors having directional control devices.

In synchronous A.C. motors of the types embodied in clocks and time switch controls and the like when first energized normally the rotors thereof are capable of starting to rotate either clockwise or counterclockwise depending in each instance upon the polarity of the first half cycle of the energizing A.C. current and the position of the rotor. To prevent the rotors of such motors from rotating opposite to the direction desired, many arrangements have been proposed and used with limited success and acceptance.

An object of the present invention is to provide a synchronous A.C. motor with improved means for preventing the rotor thereof from turning in a direction opposite to that which is desired.

Another object of the present invention is to provide the foregoing motor with such direction control means which is positively operated by the rotor in response to the initial driving force of the energizing current.

And another object of the present invention is to provide the foregoing motor and directional control which requires no spring or biasing means.

The present invention contemplates a synchronous A.C. motor having stator means and rotor means limited to rotation in one predetermined direction; the stator means including a coil means with a tubular body portion, a pole piece disposed at one end of the coil means and providing an annular series of spaced salient stator poles extending therefrom axially within the body portion, and a tubular crown means axially aligned with the body portion at the opposite end of coil means from the pole piece and having inner surface providing an annular series of spaced inwardly projecting fixed stop portions; the rotor means including a rotatable shaft extending axially through the coil means and having an enlarged free end portion disposed in a plane transverse to the axis of rotation of the shaft, a rotor member rotatable on the shaft and providing an annular permanent magnet face disposed in spaced concentric face to face relationship with the salient poles and an end portion disposed in spaced parallel relationship with the free end portion of the shaft; and lost motion means including a movable stop portion coupled to one of the end portions for rotation therewith and movement relative thereto in a plane transverse to the axis of such rotation between a retracted position permitting the rotor means to turn in one direction and an extended position to engage one of the fixed stop portions to prevent the rotor means from turning in the opopsite direction, and means connected to the other end portion causing the movable stop means to move to the extended and retracted position prior to rotation of the shaft by rotation of the rotor member.

The foregoing and other objects and advantages will appear more fully hereinafter from a consideration of the detailed description which follows, taken together with the accompanying drawing wherein several embodiments of the invention are illustrated by way of example. It is to be expressly understood, however, that the drawing is for illustration purposes only and is not to be construed as defining the limits of the invention.

FIGURES 1 and 2 are plan views of a motor made in accordance with the present invention with directional control means thereof in alternate positions.

FIGURE 3 is a sectional view taken on line 3—3 of FIGURE 2.

FIGURES 4 and 5 are plan views of another form of directional control device in its alternate positions.

FIGURES 6 and 7 are views similar to FIGURES 4 and 5 for still another form of directional control device.

Referring now to the drawings and particularly to FIGURES 1 to 3, a motor in accordance with the present invention is provided with a stator assembly or means 10 and a rotor assembly or means 30 which is permitted to rotate counterclockwise, as viewed in FIGURES 1 and 2, and is prevented from clockwise rotation.

The stator assembly or means 10 includes a spool or spool assembly 11 of a suitable dielectric material having a tubular body portion 12, and annular flange 13 extending outwardly from one end of the body portion, and a second annular flange 14 extending outwardly from the body portion 12 and axially spaced from the flange 13. The flanges 13 and 14 with the body portion 12 therebetween define an annular recess for a coil winding 20. The spool or spool assembly 11 on the side of flange 14 opposite from the flange 13 is provided with a crown portion which forms a part of the directional control of the motor. This crown portion may be formed by an annular series of spaced thin wall sections 15 extending axially from the body portion 12 which are encircled by a ring member 16 having an annular series of spaced lugs 17 which extend or protrude inwardly between the thin wall portions or sections 15 which form indent areas therebetween. Each of the lugs 17 provide two lateral stop faces or surfaces 18 and 19 adapted to be engaged to prevent the rotor assembly 30 from turning each in one direction opposite from the other and depending upon the undesired direction of rotation. In this instance, the stop surfaces or surfaces 18 of the lugs 17 are used to stop or prevent clockwise rotation of the rotor means or assembly 30. Although not shown, the thin wall portions 15, the ring member 16 and its lugs 17 may be of a unitary construction made as an integral part of the spool 11, or suitably fixed thereto by any means known in the art.

As in U.S. Patent 3,164,734 granted Jan. 5, 1965, to R. A. Heinzen and assigned to the same assignee as is the present application, the spool 11 is fixedly mounted in a motor casing comprising, in part, a cover 23 connected to a wall portion 25 adjacent the flange 13. The motor is provided with at least one pole piece 21 which is disposed adjacent the wall 25 and within the tubular body 12. The pole piece 21 has an annular series of spaced salient poles or fingers 22 which extend from the outer periphery thereof along the inner surface of the tubular body portion 12 toward the flange 14. Although not shown, the salient poles 22 alternatively may be struck from the wall portion 25 or may extend from the inner periphery of a pole piece provided by a plate-like ring disposed between the annular flange 13 and the wall portion 25.

A second series of spaced salient poles 24 alternating between the salient poles 22 within the tubular body portion 12 may be struck from the motor cover 23, best shown in FIGURE 3, or may be provided by a pole piece (not shown) in the form of a plate-like ring disposed between the flange 14 and the motor cover. All of the first series of salient poles 22 are of the same instantaneous polarity, depending upon the half cycle of the A.C. current of the coil 20, which is reversed by the next subsequent A.C. current half cycle. When the motor is provided with two series or sets of salient poles, the instantaneous polarity of the second series of poles 24 is opposite to the polarity of the series of poles 22.

The rotor means or assembly 30 is provided with a shaft 31 which is supported by a bearing means 26 for rotation on and through the center of or the axis of the stator means or assembly 10. The shaft 31 extends from the gear box portion (not shown) of the motor, disposed on the side of the wall portion 25 opposite from the stator assembly 10, and terminates in a free end within the crown portion of the spool assembly 11. A disc or disc means 32, disposed in a plane normal to the axis of rotation of the rotor assembly 30, may be integral with or provided by a fitting member on the free end of the shaft 31, and has a central boss or boss portion 33 of rectangular shape which extends therefrom toward the bearing 26. As best shown in FIGURE 3, the disc means 32 and its boss portion 33 are disposed within the crown portion of the spool 11.

The rotor assembly 30 is provided with a permanent magnet rotor of any suitable construction which provides an annular face in spaced relationship within the salient stator poles 22 and 24. The annular rotor face generally is of a permanent magnet material with a series of polarized segments or areas each being of a polarity opposite to the polarity of the adjacent segments or areas as shown in the aforementioned U.S. Patent 3,164,734.

In this instance, as best shown in FIGURE 3, the rotor member is formed by a rotor disc or end wall portion 34 and an annulus portion 35 of magnetic material connected thereto for providing the permanent magnet face. The disc portion 35 is freely rotatable on the shaft 31 and is axially retained between the bearing 26 and the rectangular boss 33. A pin, cam or drive member 29, spaced radially outwardly from the shaft 31, is fixed at one end to the rotor member disc portion 34 and extends axially therefrom into the plane of the rectangular boss 33. The annulus 35 of permanent magnet material is fixed at one end to the side of the rotor member disc portion 34 opposite from the cam member 29 and extends axially therefrom toward the wall portion 25.

To complete the rotor assembly 30, a cam follower or directional control member or disc 36 with an elongated rectangular slot 37 is provided. The directional control member 36 is disposed between the shaft end disc 32, and the rotor member disc portion 34 with the rectangular boss 33 disposed in the slot 37 which couples the directional control member for rotation with the shaft 31 and for sliding movement relative thereto along an axis which extends transversely through the axis of rotation of the rotor assembly 30. The directional control member or disc 36 has a protrusion or lug portion 38 which extends outwardly therefrom, and a peripheral slot or recess 39 which provides a pair of spaced substantially cam surfaces for the pin 29. The protrusion or lug portion 38 extends outwardly and the cam walls provided by the peripheral slot 39 are spaced along the axis of sliding movement of the directional control member or disc 36.

The directional control member or disc 36 is slidable on the boss portion 33 between a retracted position, where the lug portion or protrusion 38 does not extend beyond the circular face of the permanent magnet rotor member ring 35 as shown in FIGURE 1, and an extended position with the lug portion or protrusion forming a detent extending into an indent recess provided by a thin wall portion 15 between two spaced lug portions 17 of the spool crown. Thus, it should be seen that the novel directional control is, in effect, a lost motion device between the rotor member 34/35 and the shaft 31 of the rotor assembly 30.

When the protrusion or lug portion 38 engages the proper one of the faces of a spool assembly lugs 17 and prevents the rotor assembly 30 from turning in one direction, the polarized segments of the annular face provided by the permanent magnet portion 35 must be positioned or indexed relative to the salient stator poles 22 and 24 to cause the rotor assembly to start rotating in the opposite or desired direction when the magnetic field effect thereon reverses.

In operation, with the motor in a quiescent state and initially positioned as shown in FIGURE 1, an A.C. current is provided to energize the coil 20 thus creating a magnetic field acting on the permanent magnet portion 35 to cause the rotor member disc portion 34 and cam or pin member 29 to rotate in a counterclockwise direction. The pin or cam member 29 is retained by this rotation in engagement with the rear cam surface of the peripheral slot 39 which is furthest away from the lug portion 38. This holds the directional control or cam follower member 36 in its retracted position and causes this retracted member and the shaft 31, coupled thereto by the rectangular boss 31 and slot 37, to rotate with the rotor member 34/35.

If, however, upon energization of the coil 20 the resulting field causes the permanent magnet portion 35 and the rotor member disc portion 34 to start rotating in a clockwise direction, the pin or cam member 29 is carried or moved by the rotating rotor member disc portion 34 away from the rear cam surface and into engagement with the other or front cam surface of the peripheral slot 39 thereby causing the directional control or cam follower member 36 to move to its extended position with lug portion or protrusion 38 extending outwardly past the periphery of the permanent magnet portion 35. As the extended directional control member 36 then starts to rotate in a clockwise direction, the protrusion or lug portion 38 moves into engagement with the face 18 of the adjacent spool assembly lug 17 to prevent clockwise rotation of the rotor assembly 30.

With the directional control means blocking rotation in this manner, simultaneous polarity reversal of each set of salient poles 22 and 24 in response to the A.C. energization of the coil 20 establishes a resulting field which causes the permanent magnet portion 35 and the rotor member disc portion 34 to rotate in a counterclockwise direction. The pin or cam member 29 moves back into engagement with the rear cam surface of the peripheral slot 39 causing the directional control member 36 to return to its retracted position and to rotate with the shaft 31 in the desired counterclockwise direction.

The peripheral slot 39 is angularly offset approximately 90 degrees in a counterclockwise direction from the lug portion 38 and the directional control member 36 when in its extended position prevents the rotor assembly 30 from rotating in a clockwise direction. The rotor assembly 30 can be modified for only clockwise rotation by inverting the directional control member 36 so the slot 39 is now angularly offset the same amount from the lug portion 38 as before but, in this instance, in a clockwise direction therefrom.

The rotor assembly 30 also may be modified by changing the construction of the permanent magnet rotor member 34/35, the directional control or cam follower means 36 or any other parts of this assembly. A different form of suitable permanent magnet rotor member from that shown in FIGURE 3 of drawings is disclosed in the aforementioned U.S. Patent 3,164,734.

The rotor shaft 31, the shaft end disc means 32 with its rectangular boss 33, the rotor member comprising the disc portion means 34 and annular permanent magnet portion 35, and the pin or cam means 29 of the rotor assembly 30 are included in a modified rotor assembly 40 which further includes a directional control member 40 or cam follower means 41 shown in its retracted and extended positions in FIGURES 4 and 5, respectively. The directional control member 41 has an elongated rectangular slot 42 and a lug portion or protrusion 43 corresponding to the slot 37 and protrusion 38, respectively, of the directional control member 36.

In place of the peripheral slot 39, the directional control member 41 is provided with a closed elongated slot 44 on the opposite side of the rectangular slot 42 from the protrusion 43. The slot 44, which is disposed on an axis transverse to the axis of sliding movement of the member 41, receives and forms a track for the pin or cam means 29. The end of the slot 44 closer to the axis of movement of the member 41 is equidistant from the shaft 31 when the directional control member is retracted (FIGURE 4) as is the other end of the slot when the directional control member is extended (FIGURE 5). Therefore, when the rotor member 34/35 is rotated relative to the rest of the rotor assembly 40, the pin or cam means 29 is moved from one end of the slot 44 to the other causing the directional control or cam follower member 41 to move from one of its positions to the other.

As shown in FIGURES 6 and 7, another modified rotor assembly 45 is provided with a directional control member 46 having an elongated rectangular slot 47 and a lug portion or protrusion 48 corresponding to the slot 37 or 42 and the protrusion 38 or 43. In place of the slot 39 or 44, the directional control member is provided with an oversize opening 49 to receive the pin or cam means 29 which, in this instance, is connected to a disc member 50 mounted on the end of the shaft 31 instead of the disc member 32. In place of the rectangular boss 32, the rotor member disc or end portion 34 is provided with a rectangular boss 51 which is received in the slot 47. Accordingly, the rotor member 34/35 and the directional control member 46 are coupled to rotate in unison on the shaft 31 by the slot 47 and boss 51 which also permits the directional control member 46 to move in a plane transverse to the axis of rotation of the rotor assembly 45. When a directional control member is coupled to rotate with a rotor member as in the rotor assembly 45, the directional control member simultaneously rotates relative to the shaft as it moves between its extended and retracted positions.

The desired direction of rotation of rotor assemblies 40 and 45 can be reversed by inverting the directional control or cam follower members 41 and 46, respectively, in the same manner heretofore described with respect to the rotor assembly 30 and the directional control member 36. It also should be understood that any of the directional control members 36, 41 or 46 may be coupled for rotation with either the shaft 31 as in FIGURES 1 to 5 or to the rotor member 34/35 as in FIGURES 6 and 7.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a synchronous A.C. motor having a rotor construction limited to rotation in one predetermined direction, a combination comprising
   a stator coil including a spool having a tubular body portion and a tubular crown portion at one end of said body portion in axial alignment therewith,
   said crown portion having an inner surface formed to provide an annular series of spaced inwardly extending fixed abutments,
   at least one pole piece disposed at the end of said body portion opposite from said crown portion and providing an annular series of spaced axially disposed salient poles within said body portion,
   a rotatable shaft member,
   a rotor member mounted on said shaft member and rotatable relative thereto,
   said rotor member having a permanent magnet face at its periphery in spaced face to face relationship with said salient poles, and
   lost motion means coupling said shaft and rotor members for rotation in unison after limited relative rotation therebetween,
   said lost motion means including a stop member positively moved in a plane normal to the axis of rotation of said shaft member between a retracted and an extended position in response to relative rotation in different directions between said rotor and shaft members and retained in the position to which it is moved, and
   said stop member engaging one of said fixed abutments when in its extended position thereby limiting said shaft and rotor members to rotation in unison to one predetermined direction when said stop member is in its retracted position.

2. The synchronous A.C. motor in accordance with claim 1, and
   said spool having a pair of annular flange portions each extending outwardly from a different end of said body portion, and
   said spool body, crown and flange portions being integral.

3. The synchronous A.C. motor in accordance with claim 1, and
   another pole piece disposed at the end of said body portion adjacent said crown portion and providing another annular series of spaced axially disposed salient poles each positioned between a different two salient poles of said one pole piece.

4. The synchronous A.C. motor in accordance with claim 3, and
   a motor cover enclosing said stator coil and providing said other pole piece.

5. The synchronous A.C. motor in accordance with claim 3, and said crown portion comprising
   an annular series of equally spaced wall portions extending said one end of said body portion, and
   a cover member providing an annular wall portion encircling said annular series of spaced wall portions and having a plurality of spaced inwardly extending abutments each extending through a different space between two of said series of wall portions and terminating inwardly thereof,
   said cover member being open at one end adjacent the end of said body portion and having a wall at its other end closing the end of the space within the tubular body and crown portions.

6. The synchronous A.C. motor in accordance with claim 1, and
   said stop member being a cam follower coupled to one of said shaft and rotor members for rotation therewith and for movement between its retracted and extended positions relative thereto, and
   the other of said shaft and rotor members having cam means engaging said cam follower thereby causing its movement to its extended and retracted positions and retaining it in the position to which it is moved.

7. The synchronous A.C. motor in accordance with claim 6, and
said cam follower being inverted relative to said rotor member thereby reversing the one predetermined direction of rotation in unison of said shaft and rotor members.

References Cited
UNITED STATES PATENTS

| | | | |
|---|---|---|---|
| 2,972,687 | 2/1961 | Kohler | 310—41 |
| 3,403,273 | 9/1968 | Higuchi | 310—41 |
| 3,448,308 | 6/1969 | Pervorse et al. | 310—41 |

WARREN E. RAY, Primary Examiner